F. J. HEIDEMAN AND J. N. HADJISKY.
MEANS AND METHOD OF REGULATING AUTOMATIC MECHANICAL REFRIGERATORS.
APPLICATION FILED JAN. 14, 1918.
1,329,350.
Patented Jan. 27, 1920.
2 SHEETS—SHEET 1.
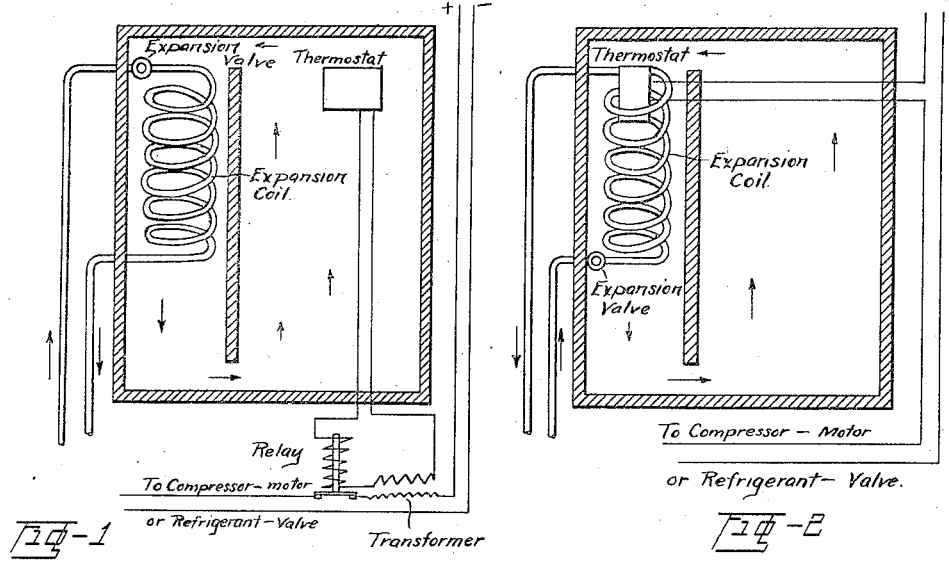
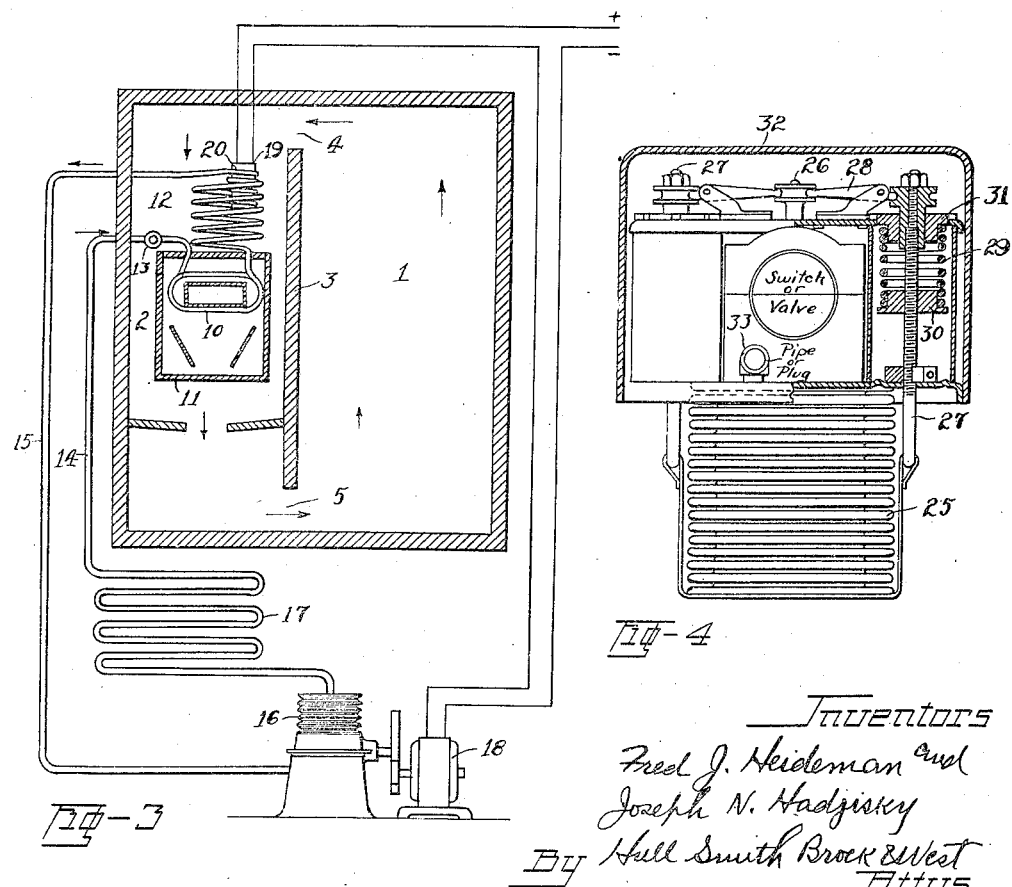
Inventors
Fred J. Heideman and
Joseph N. Hadjisky
By Hull Smith Brock & West
Attys

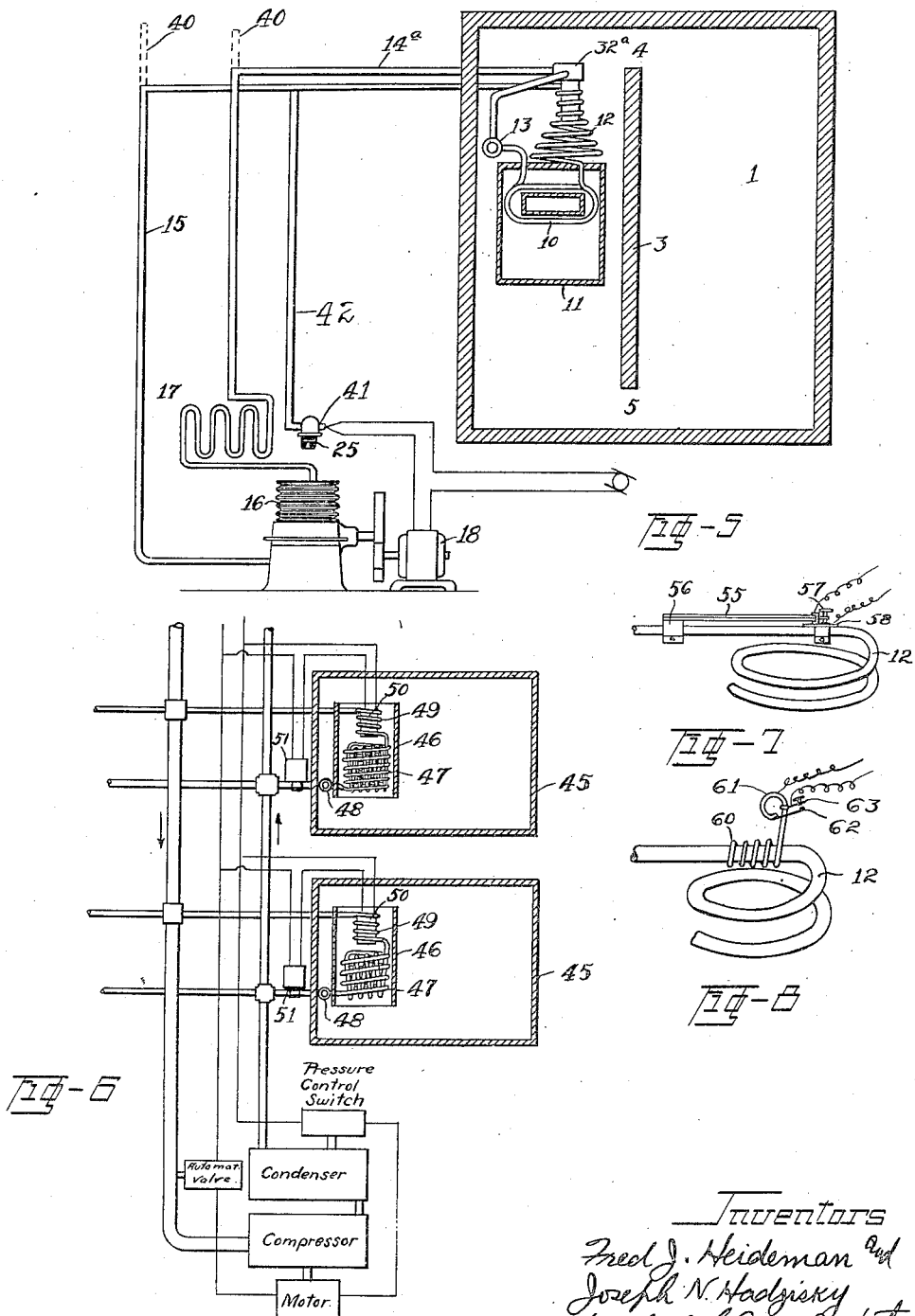

UNITED STATES PATENT OFFICE.

FRED J. HEIDEMAN AND JOSEPH N. HADJISKY, OF DETROIT, MICHIGAN, ASSIGNORS TO KELVINATOR CORPORATION, OF WILMINGTON, DELAWARE, A CORPORATION OF DELAWARE.

MEANS AND METHOD OF REGULATING AUTOMATIC MECHANICAL REFRIGERATORS.

1,329,350.  Specification of Letters Patent.  Patented Jan. 27, 1920.

Application filed January 14, 1918. Serial No. 211,751.

*To all whom it may concern:*

Be it known that we, FRED J. HEIDEMAN and JOSEPH N. HADJISKY, citizens of the United States, residing at Detroit, in the county of Wayne and State of Michigan, have invented a certain new and useful Improvement in Means and Methods of Regulating Automatic Mechanical Refrigerators, of which the following is a full, clear, and exact description, reference being had to the accompanying drawings.

This invention relates to the art of refrigeration and particularly to mechanical refrigerating units of small size wherein the control of the refrigerating devices is necessarily automatic, as in those installations which are employed in private residences, stores, restaurants, apartment houses, and on small vessels. The objects of the invention are the provision of a method and means of controlling the refrigerating operation which shall be more positive, accurate, and economical than any heretofore employed; the provision of a method and means of controlling the refrigerating devices thermostatically wherein the employment of relays, transformers, and other complicated devices may be eliminated; the provision of a method and means for automatically controlling the refrigeration which shall maintain the storage chamber at the most uniform temperature possible and at the same time shall under all conditions prevent wasteful operation of the refrigerating apparatus; the provision of refrigerating and refrigeration-regulating apparatus which can be installed with equal facility either in a special casing or in a standard ice box, and employed with equal success in a unitary system or in a multiple system; while further objects and advantages of the invention will appear as the description proceeds.

Refrigeration in large units has been successful for a great many years, but in those installations it is possible to employ skilled attention and automatic regulation becomes unnecessary, while the large size of the machine renders unimportant certain small losses which become fatal to success with a small unit. For a small installation, such as that encountered in domestic use, skilled or constant attention becomes impossible and automatic regulation therefore imperative. Even supposing that the housewives or servants, who would ordinarily be trusted with the custody and management of such a machine, were sufficiently skilled to manage such a machine successfully, the very necessity for so managing the same, largely offsets the advantage contemplated in its use, namely the avoidance of all attention and the dispensing with the necessity of periodic icing. Furthermore the apparatus can be operated economically only by close regulation, and personal attention is not ordinarily sufficiently close, constant, or exact to enable a small unit to compete with outside icing.

Heretofore, however, the automatic control of such a domestic installation, or indeed of any installation, has been nearly or quite impossible and always expensive and unreliable. Owing to the customary arrangement and location of the thermostatic appliances heretofore employed, the same have had an extremely small margin of operating temperature, have themselves been hesitating and unreliable, and have required to be supplemented by relays, transformers, rheostats and other complicated and expensive apparatus; the essence of our invention consists in locating the thermostatic device in a new and peculiar position as regards the storage chamber and refrigerating coil, and in locating those refrigerating coils in a new and peculiar location as regards the storage chamber the better to provide for the thermostatic action, as a result of which a more powerful thermostatic action is secured, a more constant temperature within the storage chamber is obtained, and uneconomical operation of the refrigerating system is positively prevented.

In the drawings accompanying and forming a part of this application we have shown certain typical embodiments of our invention, although it will be understood that the same are intended merely as illustrative and not as limitations. In these drawings Figure 1 represents diagrammatically an automatic mechanical refrigerator arranged as customary in the prior art; Fig. 2 represents the same refrigerator arranged in accordance with our invention; Fig. 3 is an illustration showing our preferred mode of arranging the thermostatic device with reference to the refrigerator and the refrigerating coils and of connecting it to the compressor motor in the case of the ordinary domestic system wherein only a single refrigerator is employed; Fig. 4 illustrates the construction of thermostat preferably (but not necessarily) employed; Fig. 5 illustrates a modified arrangement of refrigerating coil and a modified mode of controlling the refrigerant flow and compressor operation, in combination with the ordinary domestic refrigerator; Fig. 6 illustrates our improvements applied to a multiple system wherein plural refrigerators are operated from a single compressor, the refrigerators themselves being shown as of a type other than the common domestic ice-box; Fig. 7 represents a conventionalized, metal strip thermostat, and Fig. 8, a conventionalized Bourdon tube thermostat arranged in accordance with our invention.

The refrigerating appliances ordinarily employed comprise a motor, compressor, condenser, expansion valve, expansion coil and thermostat and heretofore the thermostat has been located in the storage chamber as shown in Fig. 1 where it was directly affected by the temperature conditions of the air in the storage chamber but entirely out of the direct influence of the refrigerating coils. As a result this thermostat is very sluggish, since the rate of change of the air temperature is very much less than the rate of change of the temperature of the refrigerating coil; and its operating force is necessarily small because of the maximum temperature change which can occur at that point is small. It is rare that such a refrigerator is cooled below 50° F. at this point, which is equivalent to a temperature of about 39° F. at the bottom, and the range of such a thermostat is not over 5° F. since above about 55° F. at this point food spoilage becomes large, and below about 50° F. at this point the temperature of the refrigerator bottom becomes too low. As a consequence, if such a refrigerator be started from a warm condition, the entire refrigerating coil becomes frosted long before the refrigerator as a whole becomes cool enough to operate the thermostat, and the frost extends outside of the refrigerator clear to the compressor with obvious waste of refrigerating effect. Similarly after the refrigerator has once become sufficiently cool to operate the thermostat and stop the compressor-action, the thermostat will not operate to restart the compressor until the entire refrigerating coils become warmed up to the highest temperature of the air in the refrigerator; the thermal lag of the coils prevents the refrigerating effect from being felt immediately which has heretofore resulted in the storage compartment becoming much too warm before the coils could again reduce the air temperature. Furthermore this feeble thermostatic action has heretofore necessitated the employment of a relay to operate the main controlling device and this relay has had to be operated in turn either by dry batteries which are unreliable or transformers which are expensive.

Our invention comprises the location of the thermostat in the refrigerating chamber at a point where it is subjected to the air inflowing from the storage chamber and also to the terminal portion of the expansion coils, and preferably employing in that thermostat a working fluid having the greatest possible coefficient of pressure change per unit of temperature change throughout the temperature range in question; although the construction or materials used in the thermostat is not important to our invention. The result of this arrangement is that, whatever be the temperature of the storage chamber, the thermostat will operate to stop the compressor the instant these terminal turns become refrigerated, so that frosting of the pipe between the refrigerator and compressor is prevented and the accompanying loss of power is avoided. After the compressor has stopped the warmer air entering from the storage chamber comes first into contact with these same terminal turns and with the thermostat so that it is the terminal turns which are first warmed. In case the storage chamber has not yet been brought to the desired low temperature, the warming of the thermostat will soon start the compressor and run it until the terminal turns are again chilled; and if the storage chamber cannot be reduced to the proper temperature in this way it is obvious that the fault lies in the construction of the refrigerator or the capacity of the coils as a whole, since no added beneficial effect would be secured by further running of the compressor. This arrangement is diagrammatically shown in Fig. 2.

In Fig. 3 we have shown a preferred embodiment of our invention in combination with a domestic refrigerator of the customary domestic ice-box type, wherein 1 represents the storage space which is to be refrigerated, 2 the chamber ordinarily filled with ice, and 3 the vertical partition separating these chambers, and spaced from the top and bottom of the refrigerator wall so as to provide the passageway 4 and 5 for the convection currents. For use with this type of refrigerator we preferably provide a refrigerating coil adapted to be located in the chamber 2 without any modification or disfigurement of the refrigerator, although it will be understood that the particular coil herein shown can equally well be applied to other uses, or that a different construction of coil could be employed. This preferred coil is made in two parts, the first of which, 10, is immersed in brine contained in the sheet metal receptacle 11, the second part 12 being exposed to the air stream entering through the passageway 4. The expansion valve 13 is located at the beginning of the coil 10 and is fed with refrigerant fluid through the pipe 14; the coil 12 discharges refrigerant gas through the pipe 15 which, in the simple domestic system, is connected to a suitable compressor 16, whose cylinders discharge into a suitable condenser 17 to which is connected the pipe 14 before mentioned. The compressor is driven by an electric motor 18 in series with which is attached the thermostat 19. An absorption system comprising a still or generator can be substituted for the compressor within the purview of our invention.

This thermostat is located in the path of the air inflowing through the passageway 4 and in close juxtaposition to the portion 12 of the expansion coil; in fact we preferably locate the thermostat particularly close to the extreme portion of this coil as by making its final convolutions of small size and looping the same closely about the thermostat as shown at 20, although such exactness of location is not imperative and the general object in view is sufficiently expressed by the requirement that the thermostat be located in some way adjacent the terminal turns of the coil.

Any convenient type of expansion coil and brine tank can be employed, the particular one shown being that specifically described and claimed in copending application filed January 14, 1918, Serial No. 211,753; likewise any desired or suitable type of thermostat can be employed, although we prefer the device disclosed and claimed in our copending application filed January 14, 1918, Serial No. 211,752. For purposes of convenience we have illustrated in Fig. 4 of these drawings the construction of the said preferred thermostat from which it will be seen that the same comprises an expansion vessel 25 operatively connected to the reciprocable stem 26 of a suitable electric switch or fluid valve by means of tension members 27 and connecting levers 28 operating against the tension of springs 29, one end of each spring being attached to a nut 30 threaded on to its tension member and its opposite end to a rotatable collar 31 by which its tension can be adjusted in accordance with the temperature or pressure desired. The operating parts are preferably inclosed within a housing 32, and the expansion vessel 25 can be operated either by the evaporation and expansion pressure of suitable fluid therein contained, or by the operation of fluid pressure conveyed thereto by means of a pipe 33, which latter is removed and the opening plugged when the device is employed as a thermostat.

It is desirable to charge the vessel 25 with a volatile fluid having the largest possible pressure coefficient throughout the particular temperature range encountered, and this we preferably accomplish by using the same volatile fluid which is employed in the refrigerating coils, or at least one which boils at about the same temperature, since the pressure coefficient of a fluid will be particularly great at temperatures immediately above its boiling point. The peculiar location of the thermostat which we have described brings it into the path of the air stream flowing out of the storage chamber and hence causes it to be responsive to the maximum temperature conditions therein; but also causes it to be predominantly sensitive to the chilling of the refrigerating coil in its immediate vicinity. Thus when the refrigerating apparatus is first started and the lower portions of the coil become chilled or even ice covered, no effect is produced upon the thermostat except that conveyed thereto by the convection currents; but as soon as the chilling effect of the refrigerant has reached the thermostat, its operation will occur regardless of the air temperature, thus preventing the extension of the frost line beyond that point. The arrival of the frost line at this point of the expansion coils is accompanied by a drop in temperature from that of the air, which is perhaps from 45 to 55° F., to that of the boiling refrigerant, which will vary from about 15° F. in the case of sulfur dioxid to about —25° F. in the case of ammonia, and it is a comparatively easy matter to control the motor (or still) directly without the necessity of employing transformers, relays, and other subsidiary devices. Therefore the particular thermostat which we have illustrated is not at all essential, since the large temperature change at this point would permit the employment of many thermostatic devices.

Although in Fig. 3 we have shown the thermostat as controlling the operation of the compressor motor, it is obvious that what really occurs is the control of the flow of refrigerant fluid to the expansion valve, and that this can be effected either by stopping and starting the motor or by the operation of a shut-off valve arranged in series with the expansion valve, some other expedient being then employed for controlling the motor. In Fig. 5 we have shown an arrangement such as last suggested, the coils 10 and 12 being arranged much the same as before, but the thermostatic device whose housing is shown at 32ª being provided with a valve instead of an electric switch which valve is located in the refrigerant pipe 14ª in a series with the expansion valve 13 in such wise that upon the chilling of the terminal turns of the expansion coil, the admission of refrigerant to the initial turns of that coil will be stopped; and said thermostat and terminal turns being located in the air stream above the remainder of the expansion coil, it results that these turns will be the first ones warmed so that as soon as this has occurred the admission of refrigerant will be resumed in case the air temperature be high enough to reoperate the thermostat. It will be clear that any desired number of such installations can be connected to the same compressor and condenser, as we have illustrated by the dotted lines at 40, 40; and it will be obvious that the compressor action must in such case be controlled, not by the conditions in any one installation but by the common condition in the system. Our present preferred expedient is to employ one of the same thermostatic devices arranged with an electric switch in series with motor as shown at 41 and connected by a pressure pipe 42 with the return side of the system so as to respond to the pressure or vacuum in the system generally rather than to its own internal pressure. It will be understood that the controlling device will operate at pressure either above or below atmospheric.

In Fig. 6 we have shown diagrammatically another arrangement feasible for multiple systems, introducing particularly a modified arrangement of refrigerating coils and chamber, together with an electrical valve control which is different from though more expensive than the arrangement shown in Fig. 5. In this view the common parts of the system are clearly labeled. Each refrigerating unit comprises a simple box or cupboard 45 which the apartment house builder might easily install as a part of the structure. Located in each of these boxes or cupboards is an upright hollow drum 46 open at each end to provide the necessary inflow and outflow for convection currents. In the lower part of each drum is located a compact coil of pipe 47 constituting the initial turns of the refrigerating coil and connected to the expansion valve 48. In the upper part of each drum are located the terminal turns 49 in close proximity to the thermostat 50. In this embodiment each thermostat is connected to an electric valve 51 in series with the expansion valve 48, electric energy being secured from the same mains which operate the compressor motor. Such an arrangement can be manufactured and installed very cheaply (except perhaps for the electric valves) and can be duplicated to any extent desired. It will be understood that any other valve arrangement, such for example as that shown in Fig. 5, can be substituted for the electric valves.

In Fig. 7 we have illustrated a different type of thermostat located in accordance with our invention, 12 representing the terminal turns of the expansion coil and 55 a compound metal rod clamped thereto at 56 and having at its opposite end a contact 57 adapted to make and break contact with a terminal 58 also clamped to the turn 12. In Fig. 8 the terminal turn 12 is enwrapped with a helix 60 of metallic tubing filled with volatile fluid and terminating in a Bourdon tube 61 to which are suitably attached the contact terminals 62, 63 respectively. Both these arrangements fulfil the essential requirements of this invention, that the thermostatic device be subjected both to the entering air stream and to the terminal turns of the expansion coil, and it will be understood that numerous other changes in this and other features of the invention can be made without departing from the scope of our invention or the intent of the claims hereto annexed.

Having thus described our invention what we claim is:—

1. The method of automatically refrigerating a storage space mechanically which consists in admitting a volatile liquid to the initial turns of a refrigerant expansion coil, guiding the convection currents induced thereby so as to direct them first into contact with the terminal turns of said coil, and controlling the admission of refrigerant according to the temperature existing in the region adjacent to said terminal turns.

2. The art of controlling the temperature of a mechanically refrigerated storage space, which comprises concentrating the convection currents upon the refrigerating coil, presenting the terminal turns of said coil toward the inflowing air, and controlling the admission of refrigerant to the initial turns of said coil according to the temperature existing in the region adjacent to said terminal turns.

3. The art of mechanical refrigeration of a storage space which comprises guiding the convection currents around the exterior of the evaporator in a direction opposite to the flow of refrigerant inside said evaporator, and controlling the admission of refrigerant to said evaporator in accordance with the temperature existing at a point close to the portion of said evaporator which is first contacted by the convection currents.

4. The combination, with a chamber to be cooled, of means defining a refrigerating chamber and having inflow and outflow openings for convection currents communicating with said first chamber, an expansion coil in said refrigerating chamber, having its terminal turns presented toward the inflow opening, a thermostatic device located close to said terminal turns and also exposed to the entering through said inflow opening, and means whereby the operation of said thermostatic device will control the admission refrigerant medium to the opposite end of said expansion coil.

5. The combinatiton, with a chamber to be cooled, of an expansion coil located with its terminal turns uppermost, means for directing upon said terminal turns the convection currents arising in said chamber, a thermostatic device located adjacent to said terminal turns and in the path of the warm convection currents, and means whereby the operation of said thermostatic device will control the admission of refrigerant to the initial turn of said coil.

6. In a refrigerator, an expansion coil located with its terminal turns uppermost and a refrigerant-controlling thermostat located above said coil and adjacent said terminal turns, in combination with means for directing upon said thermostat the convection currents flowing toward said expansion coil.

7. In a device of the character described, an expansion coil having at its upper part a small helical coil, a thermostat located inside said small coil whereby it will be exposed both to that coil and to the convection currents before they come in contact with the main coil, and operative connections between said thermostat and the refrigerant supply devices.

8. The combination, with a chamber to be cooled, of an expansion coil having a part of its length submerged in a brine tank and having its terminal turns extending outside of and located above said brine tank, means for concentrating and directing upon said terminal turns and brine tank the convection currents arising in said chamber, and a refrigerant-controlling thermostat located adjacent to said terminal turns and subjected to said convection currents before they touch the brine tank.

9. The combination, with a chamber to be cooled, of an expansion coil, means rendering the lower portion of said coil thermally sluggish, the upper portion of said coil comprising the terminal turns and having minimum thermal lag means for directing upon said coil the convection currents arising in said chamber, and a refrigerant-controlling thermostat located adjacent said terminal turns and in the path of said convection currents.

10. In refrigerating apparatus, a storage chamber, a second chamber having inflow and outflow openings for convection currents communicating with spaced portions of said first chamber, a cooling coil in said second chamber, and a thermostat located in close proximity to that end of said cooling coil which is nearest said inflow opening.

In testimony whereof, we hereunto affix our signatures.

FRED J. HEIDEMAN.
JOSEPH N. HADJISKY.